Figure 3:
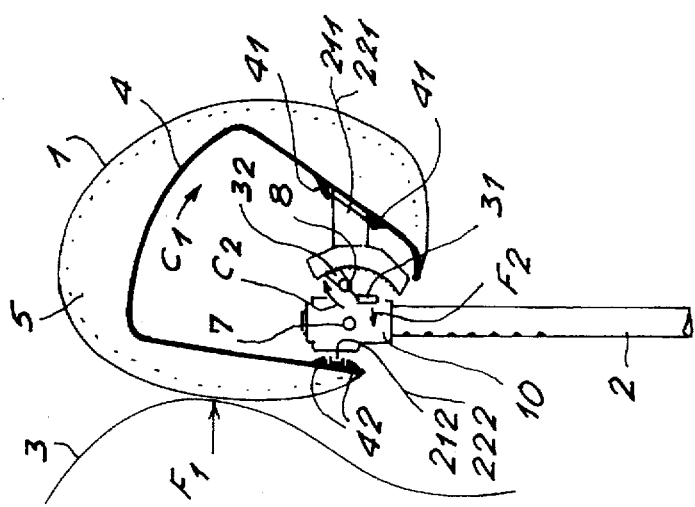

United States Patent [19]
Aufrere et al.

[11] Patent Number: 5,738,412
[45] Date of Patent: Apr. 14, 1998

[54] HEADREST FOR AN AUTOMOTIVE VEHICLE

[75] Inventors: Christophe Aufrere, Marcoussis; Patrick Daniel, Paris; Adolfo Castro, Fresnes, all of France

[73] Assignee: Bertrand Faure Equipements S.A., Boulogne Cedex, France

[21] Appl. No.: 815,106

[22] Filed: Mar. 11, 1997

[30] Foreign Application Priority Data

Mar. 18, 1996 [FR] France ..................... 96 03484

[51] Int. Cl.$^6$ ........................................ A47C 7/36
[52] U.S. Cl. .................. 297/408; 297/410; 297/216.12
[58] Field of Search ............................. 297/408, 409, 297/391, 410, 216.1, 216.12

[56] References Cited

U.S. PATENT DOCUMENTS

| | | | |
|---|---|---|---|
| 4,256,341 | 3/1981 | Goldner et al. | 297/408 X |
| 4,861,107 | 8/1989 | Vidwans et al. | 297/391 X |
| 5,199,765 | 4/1993 | Garmendia et al. | 297/391 |
| 5,290,091 | 3/1994 | Dellanno et al. | 297/408 X |

FOREIGN PATENT DOCUMENTS

| | | |
|---|---|---|
| 0 254 808 | 2/1988 | European Pat. Off. . |
| 0 564 962 | 10/1993 | European Pat. Off. . |
| 0 577 517 | 7/1994 | European Pat. Off. . |
| 2686383 | 7/1993 | France . |
| 2721267 | 12/1995 | France . |
| 26 44 485 | 4/1978 | Germany . |
| 27 08 461 | 8/1978 | Germany . |

Primary Examiner—Milton Nelson, Jr.
Attorney, Agent, or Firm—Pollock, Vande Sande & Priddy

[57] ABSTRACT

The headrest (1) comprises a translation guidance assembly (10) guided along a spindle (2) attached to the seat back and an articulation assembly (20) that is mounted swivelling on the guidance assembly, around an axis (7).

A locking member (30) swivels on the guidance assembly (10) around an axis (8) that is parallel to the axis (7), between a locked and an unlocked position. The locking member comprises a pad (31) shaped to press on the spindle (2) in the locked position, and a head (32) that is shaped to lock on a curved section (23), attached to the articulation assembly. In this locked position, that the locking member takes under the effect of inertia after a collision, the headrest can neither pivot backwards nor slide downwards.

Application of the headrest is directed to automotive vehicle seats.

10 Claims, 5 Drawing Sheets

HEADREST FOR AN AUTOMOTIVE VEHICLE

This invention covers a headrest for an automotive vehicle seat and especially the headrest position adjustment and locking system.

There are already known systems available for adjusting the height of the headrest, comprising two spindles on the headrest that are sliding in two sockets mounted on the top of the seat back. The headrest is held in place by spring loaded clips in the sockets that act on the notches made on the headrest spindles. In the event of a collision, the user's head may exercise an amount of force on the headrest, which will tend to cause it to slide downwards. The system used for holding it in place may prove inadequate to inhibit this movement. Document FR-A-2.721.267 describes a position adjustment system that includes an additional locking mechanism intended to fully lock the headrest in position in the event of a collision. This mechanism comprises an inertia driven cam which pivots in the event of a collision to engage additional notches in the headrest spindles, stopping any downward movement of the headrest. Contrarily to this last mechanism, the typical adjustment systems currently used, as described previously, are only suitable for maintaining the headrest position in normal use, the user being able to adjust the headrest position simply by pulling the headrest up or pushing it down until a comfortable position is found.

In addition, there are also existing systems for adjusting the fore and aft position of the headrest in relation to a horizontal axis. Once this position or angle is adjusted, the headrest is typically held in place only by friction elements located in the headrest articulation.

Document FR-A-2.686.383 describes a system that, in the event of a collision, stops the headrest from pivoting backwards. This system comprises an inertia driven wedge that can pivot in the event of a collision and block the headrest in position by jamming the wedge between the two parts of the articulation that, under normal circumstances, are free to pivot in relation to each other.

To ensure that the headrest is completely locked into position in the event of a rear end collision, both in the downwards translation direction and in the rearwards rotation direction, it is therefore necessary to use two mechanisms, one in the backrest to block translation, the other in the headrest articulation to block its rotation.

The present invention is designed so that in the event of a collision, the headrest will remain locked in position both as regards rotation and vertical translation, while retaining the facility of easy adjustment by the user, i.e. so that the user does not have to perform any additional actions other than placing the headrest in the desired position. The invention is especially intended to reduce the overall cost of manufacturing the system used to lock the headrest in place, by simplifying it as much as possible. It is also intended to improve its reliability, reduce the amount of space required by it, lighten the seat and reduce the space required by the headrest mounting system in the upper part of the seat back.

With these aims in view, the invention concerns a headrest for an automotive vehicle seat comprising means for adjusting the height of the headrest and means for adjusting the headrest in the fore and aft direction by rotating the headrest around a horizontal axis, characterized in that it comprises at least one guidance assembly for translationally guiding the headrest on a spindle linked to the seat back and an articulation assembly that is mounted pivoting on the said guidance assembly around an articulation axis that is orthogonal to the axial direction of the spindle, and in that it comprises a locking member pivotaly mounted on the guidance assembly around an axis that is parallel to the said articulation axis, between a locked position and an unlocked position, the locking member comprising a tightening pad shaped to apply itself against the spindle in the locked position and a head that is shaped to grip, in the said locking position, a curved section that is part of the articulation assembly so that, when it is in the locked position, any rotation effort on the headrest in a first direction corresponding to moving the headrest towards the back of the seat, will create, by engaging the curved section with the head of the locking member, a rotation torque on the said locking member so that said rotation torque presses the pad against the spindle.

According to the invention, the headrest therefore combines in a single mechanism, located inside the headrest, the means for adjusting the headrest's vertical height and horizontal fore and aft position. The seat back therefore no longer comprises any adjustment device for the headrest as the headrest guide spindles are fixed in relation to the seat back. The mounting of the spindles on the seat back may however use fixing means easily disassembled.

It is also this same mechanism that combines the headrest position locking functions required in the event of a collision. This locking acts in both the vertical and horizontal directions whereas the previous state of the art required that this function be performed by two separate mechanisms, one located in the seat back, the other in the headrest. It will be noted that these translation and rotation locking functions are not only performed by parts of the same mechanism, but that in addition, they are functionally related to each other. In fact, the greater the effort pressing the headrest backwards, the more the resistance to downwards movement will increase and, in the same way, the more the force tends to move the headrest downwards, the more the resistant torque that inhibits the rotation will increase.

In current use, the locking member will be held in an unlocked position where the pad is not in contact with the spindle and the locking head is not engaged against the curved section. In this position, the headrest can easily be adjusted for height by sliding it along the spindles. Holding the headrest in place is performed by an elastic part that works in cooperation with the notches on the spindle, with enough flexibility that it will move from notch to notch without requiring undue effort on the headrest. In the same way, the forward to aft, and back, rotation of the headrest can be performed easily by hand. The headrest is held in position only by a friction system within the articulation.

In the event of a collision affecting the vehicle, especially a rear end collision, the locking member pivots by inertia and moves to the locked position described previously. Maintaining the locking member in one or the other of its two positions will preferably be performed by a two position bistable spring mounted between the locking part and the guidance assembly. The force required to move the locking part from the unlocked position to the locked position will depend on the dimensioning of the spring.

The adjustment of the trigger threshold, i.e. the amount of collision energy required to move the locking member into the locked position, can therefore be performed either by adapting the mass of this part (or more precisely the ratio of masses between that of the pad and the locking head of the locking member), or by adapting the characteristics of the spring to adjust the intensity of the force to overcome in order to move from the unlocked position to the locked position.

Preferably, the link between the locking member's head and the curved section, in the locked position, will be performed by the contact between a surface of the said head and a revolution surface on the curved section.

So that locking can take place regardless of the adjustment position of the headrest in rotation, the revolution surface axis will be practically combined with the headrest articulation axis.

Although the link at contact level between these various surfaces can take place by friction alone, this link will be improved by providing a grooved contact patch on the locking head. The revolution surface of the curved section should also comprise grooves that are parallel to those on the said locking head and to the articulation axis, which will thus produce a gearing effect between the locking member and the curved section.

To increase the sliding resistance of the headrest along the spindle, when the locking member is in the locked position, the friction of the pad against the spindle will be increased by making the pad out of a material that has a high friction factor or by coating it with such a material. In addition, the material used will be at least partly elastically deformable, increasing the contact surface and therefore increasing friction.

In addition, the ability of this material to deform will ensure adequate pressure of the pad on the spindle, even in the case of the blocking member being, under the effect of the rotation torque transmitted via the curved section, moved into a jamming position where its head becomes trapped between the said curved section and the axis of rotation of the locking part. To avoid, in such cases, the effort on the locking member axis becoming too high, it is preferable to allow a certain amount of possible freedom, in the direction that is perpendicular to the spindle axis, for the locking part axis. Therefore, as it will be able to understand better later, all of the rotation torque transmitted by the curved section to the locking part will become a pressure applied by the pad against the spindle.

According another of its features, the headrest comprises means for automatically pulling back the locking part from its locked position to its unlocked position when the headrest is pivoted in the opposite direction to the said first direction of rotation.

Therefore, the return, after a collision situation, to the normal working position that allows easy adjustment, could occur simply by pivoting the headrest to the end of its forward travel. Once the locking part was unlocked in this way, the headrest could then be returned to the desired adjustment position.

Other characteristics and advantages will appear in the description that will be made of a headrest in accordance with the invention.

Figure 2:
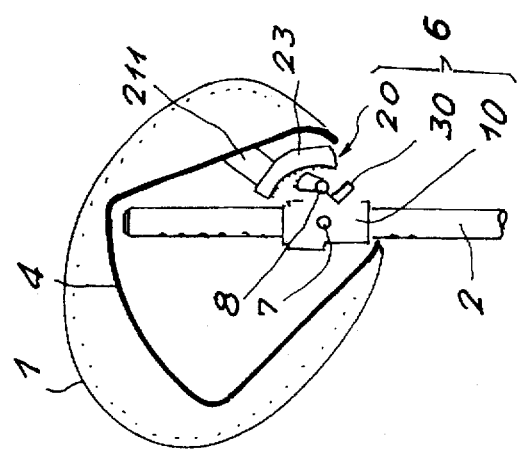
Figure 1:
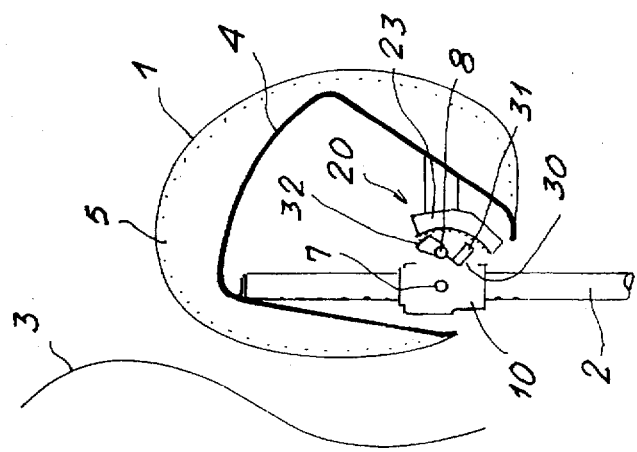
Figure 4:
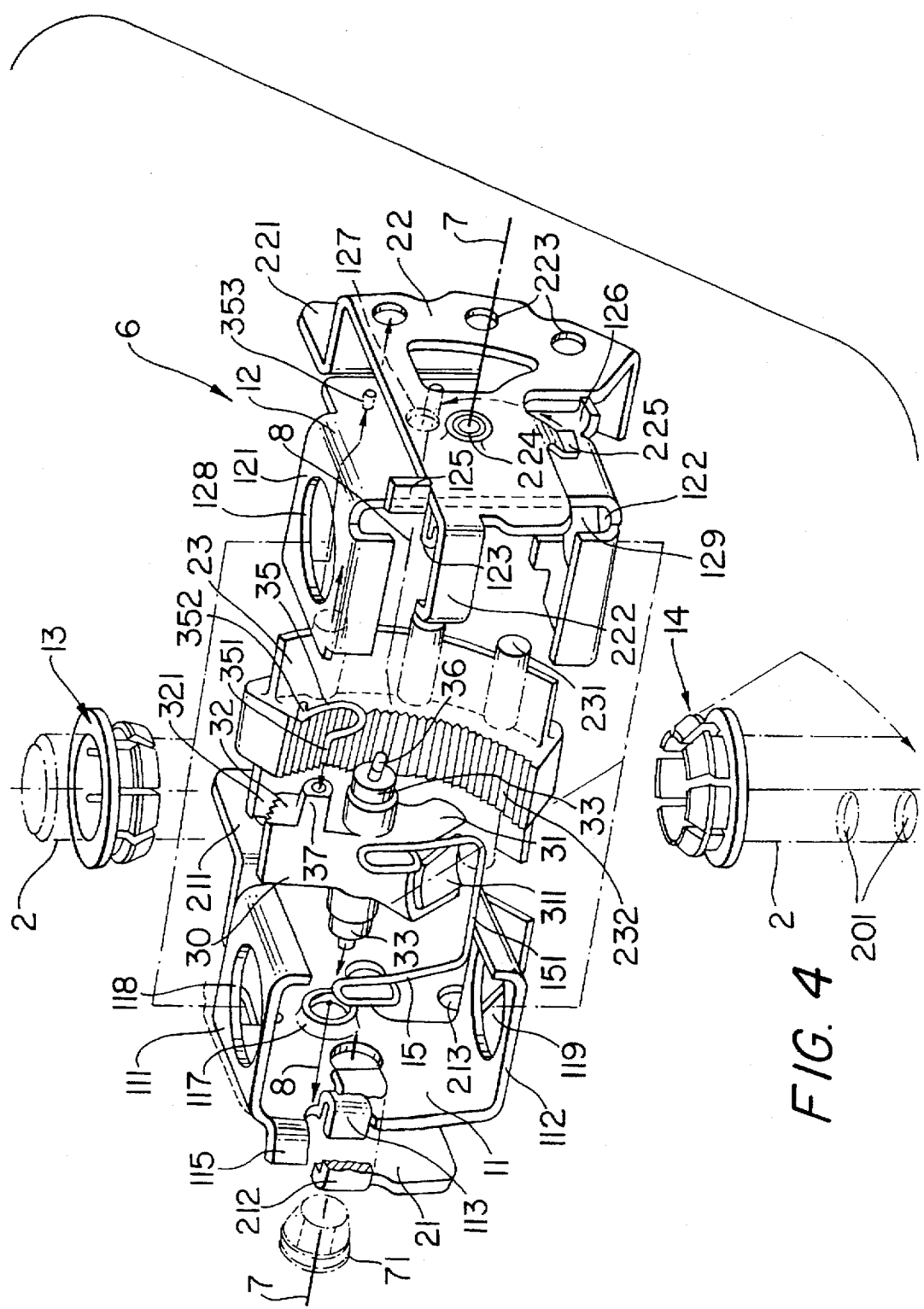
Figure 5:
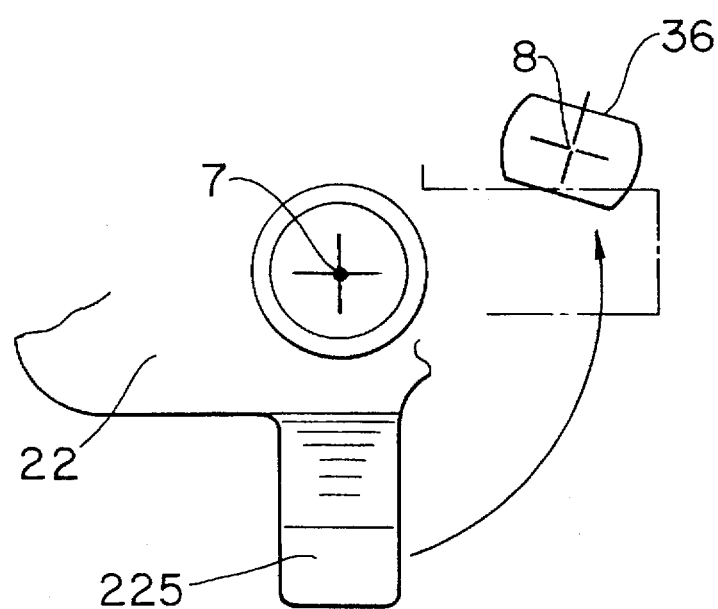
Figure 6:
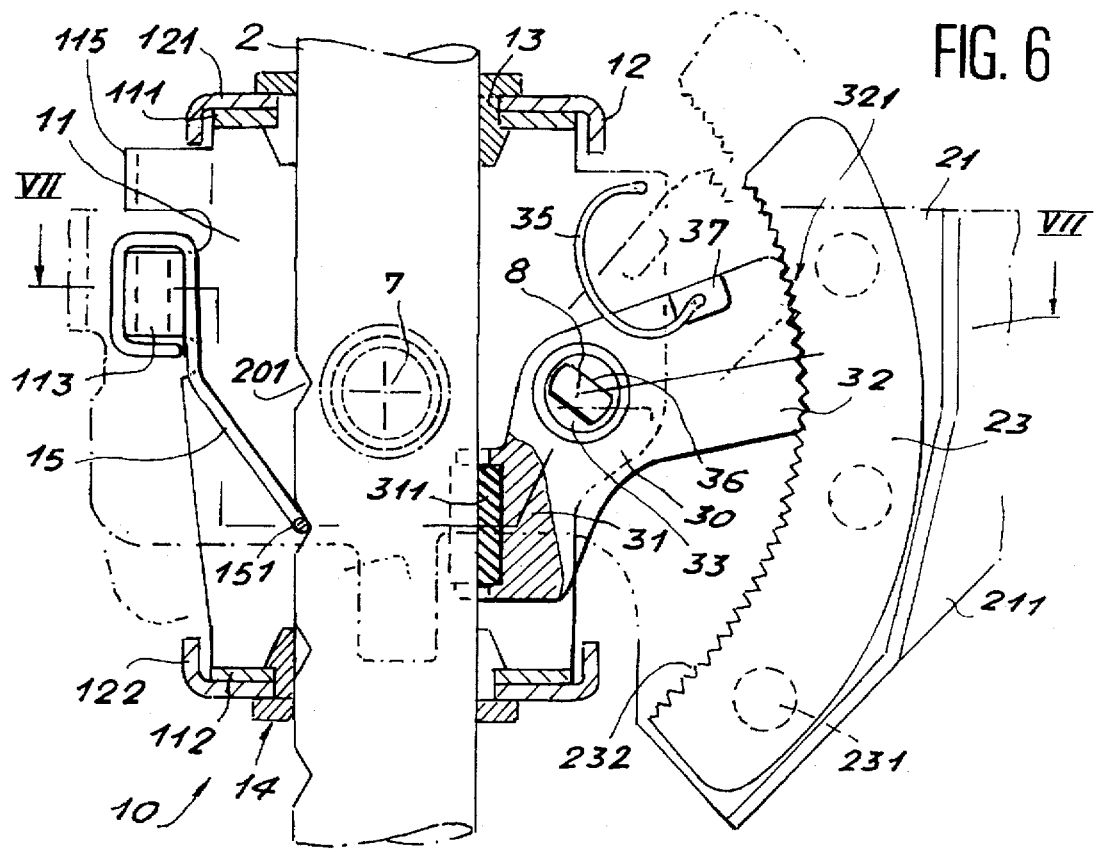
Figure 7:
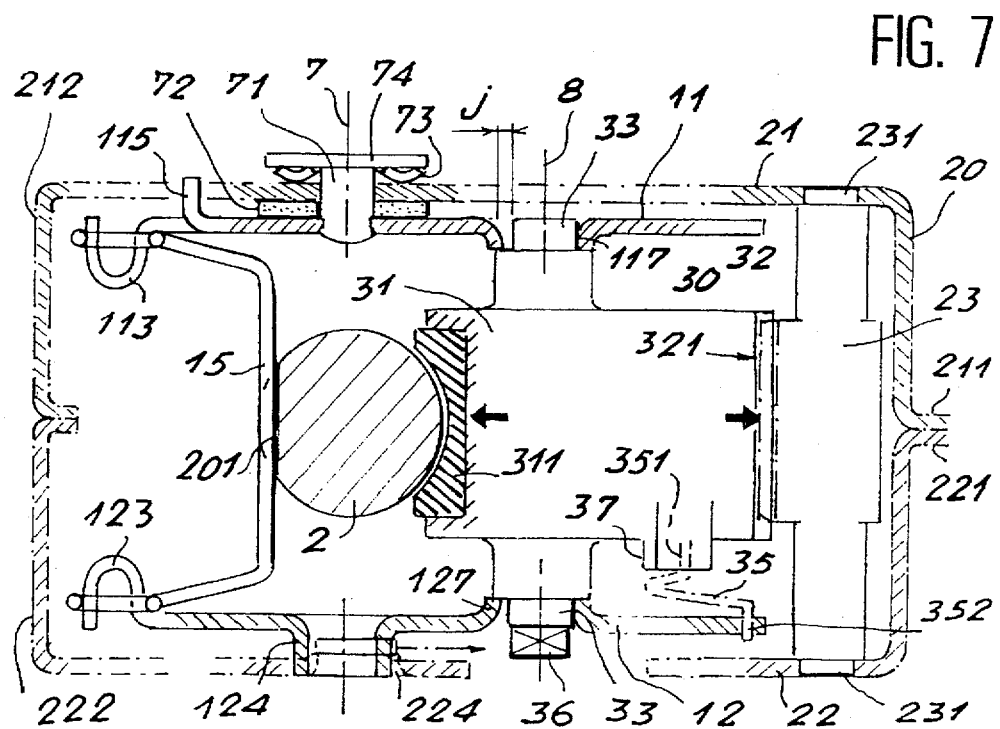

We will refer to the appended drawings, where:

FIG. 1 is a simplified cross sectional view of the headrest in its lower position, tilted back and unlocked, FIG. 2 is a similar view but with the headrest tilted forward, FIG. 3 is a similar view but with the headrest shown in its raised position, locked after a collision condition, FIG. 4 is an exploded perspective view illustrating the various parts that form the headrest adjustment and locking mechanism, FIG. 5 is a detailed view illustrating the means for unlocking the locking member, FIG. 6 is a cross section view, in the vertical plane, of the mechanism illustrated in FIG. 4, FIG. 7 is a cross section view, along the VII—VII line, of the illustration in FIG. 6, FIGS. 8, 9 and 10 illustrate the operation of the locking system at the time of a collision.

The illustration in FIG. 1 shows a cross section of the headrest 1, adjustable for height by sliding it along two spindles 2, that are attached to the seat back (not shown). Line 3 represents the user's head. The headrest 1 is formed of a rigid casing box 4, that could for example be made of plastic, covered with padding 5, and within which the mechanism for adjusting the headrest, both for vertical height and fore and aft angle, is entirely contained.

This mechanism comprises a guidance assembly 10 that guides the translation motion along the spindle 2 and an articulation assembly 20 that is part of the casing box 4, comprising a curved section 23, and mounted to pivot on the guidance assembly 10, around an articulation axis 7. A locking member 30 that comprises a pad 31 and a head 32 in the form of a cam is also mounted to pivot on the guidance assembly 10, around an axis 8 that is parallel to the articulation axis 7. These various parts of the mechanism 6 will be described in detail later.

Note that the casing box 4 provides sufficient internal volume to allow space for the ends of the spindles 2, when the headrest is adjusted to its lowest position. FIG. 1 shows the headrest adjusted to it maximum aft recline position, while FIG. 2 shows the headrest in the maximum forward incline position. These two positions are, as we will see later, defined by rotation stops provided on the guidance assembly 10 and on the articulation assembly 20, respectively. In these two figures, the locking member 30 is shown in the unlocked position, where the headrest can be adjusted freely for height and angle, the pad 31 and the head 32 being respectively disengaged from the spindle 2 and the curved section 23.

In FIG. 3, the headrest is shown in the high position and the locking member 30 is shown in a locked position adopted as a result of a collision, with the head 32 engaged and in contact with the curved section 23. The pad 31 is in contact with spindle 2. In this position, a force F1 applied by the user's head 3 against the headrest 1, generates a torque C1 that tends to rotate the headrest around the axis 7; this torque is converted, by engaging the locking head 32 with the curved section 23, into a torque C2 that rotates the locking member 30 around its axis 8. This in turn generates a force F2 applying pressure on pad 31 against the spindle 2. The pivoting of the headrest towards the rear is therefore blocked and simultaneously the friction of pad 31 on spindle 2 caused by the pressure force F2 stops the headrest from sliding downwards. The result is that the user's head remains firmly held in place by the headrest.

We will now describe in greater detail, and in relation with FIGS. 4 to 7, the various elements forming the mechanism 6.

The translation guidance assembly 10 comprises two parts 11 and 12 with a general U shape. These parts will be referred to as inside right side plate 11 and inside left side plate 12 (the left and right sides corresponding to the left and right sides of the seat respectively, they are therefore seen reversed in FIG. 4). Each inside side plate 11 and 12 has an upper lip 111 and 121 respectively, and a lower lip 112 and 122 respectively. In assembly 10 when completely assembled, the two side plates 11 and 12 overlap one against the other. The lips 111 and 112 on the right side plate 11 are inserted against the lips 121 and 122 on the left side plate 12, as shown in FIG. 6. The four lips 111, 112, 121 and 122 have holes 118, 119, 128 and 129 drilled into them and aligned axially when the side plates are assembled and held together by sockets 13 and 14 that guide the spindle 2. Each socket, for example made out of plastic, is clipped through the said holes, socket 13 through holes 118 and 128 of the upper lips 111 and 121 and socket 14 through holes 119 and 129 of the lower lips 121 and 122. A spring 15, for example made out of steel wire and folded into a U shape, is held at its ends by clamps 113 and 123 shaped by folding the inner side plates 11 and 12 respectively. The middle part of the spring 151 is shaped to fit elastically into notches 201 on the spindle 2 so that the headrest is held on the spindle in the height adjustment position chosen by the user.

The articulation assembly 20 is formed of two side plates, an outer right side plate 21 and an outer left side plate 22, that are connected together by flanges 211 and 221 shaped towards the back of the side plates. Note that these flanges, as well as brackets 212 and 222 folded up from the sides located at the front of the said outer side plates, are used to retain the articulation assembly within the box 4, for example by inserting these flanges and brackets between raised parts 41 and 42 formed by molding as integer part of the box 4, as shematically shown in FIG. 3.

The translation guide assembly 10 is located between the two outer side plates 21 and 22 of the articulation assembly 20. This latter assembly is mounted so that it pivots on the guidance assembly 10 around axis 7, on one hand by engagement of a collar 124 mounted, formed in the inner side plate 12, in a bearing 224 of the outer side plate 22, and, on the other hand, by a rivet 71 passing in a hole drilled through the other outer side plate 21 and crimped into the inner side plate 11, as shown in FIG. 7. A friction washer 72 made of plastic is placed around the rivet, between side plates 11 and 21, and elastic components such as an elastic washer 73 are located between the head 74 of the rivet and the outer side plate 21, to press the side plates of the two guidance 10 and articulation 20 assemblies against the friction washer 72. The friction of side plates 11 and 21 against washer 72 will maintain the inclination of the articulation assembly 20 and therefore of the headrest, in the adjustment position set by the user.

The pivoting of the headrest is limited by folded tabs 115, 125 and 126 of the inner side plates 11 and 12, against which the edges of the outer side plates 21 and 22 will stop.

Between the two outer side plates 21 and 22, and towards the rear of the articulation assembly 10, is located the curved section part 23, held in position by engaging bosses 231 formed on this part within drillings 213 and 223 in side plates 21 and 22. The curved section 23 has a surface 232 that is oriented towards the spindle 2, with an arc of a circle cross section having its centre at the headrest rotation axis 7. This surface 232 will preferably comprise grooves oriented parallel to said axis 7.

The locking member 30 is mounted so that it pivots on inner side plates 11 and 12 around the axis 8, located between the curved section 23 and the headrest articulation axis 7, using two shafts 33 guided by bearings 117 and 127 realised in the inner side plates 11 and 12.

The head 32 of the locking member 30, located above the level of axis 8, is sized so that it comes into contact with the surface 232 of the curved section 23 in the locking position, the contact area also being located above the level of axis 8, as shown in FIG. 6. The surface of the head 32 also comprises grooves 321.

The pad 31 that is located opposite the head 32 with respect to axis 8 is shaped for and sized to press against the spindle 2, in the said locked position, along an area located below the level of axis 8. The pad 31 can be made up in large part of, or be coated with, a coating 311 (as shown in the drawings), using a material that can deform elastically and with a high degree of friction when in contact with the spindle 2, for example rubber could be used.

A spring 35, for example in the shape of an open ring, is mounted between the translation guidance assembly 10 and the locking member 30, so that together they form a bistable system, one stable position being the locked position as shown in FIGS. 3 and 6, the other stable position being the unlocked position shown in FIGS. 1, 2 and 4. A first end 351 of the spring 35 is inserted into a hole of a hump 37 realised laterally on the head 32 of the locking member and the other end 352 is inserted into a hole 353 drilled into one of the inner side plates 12.

The locking member is therefore held in its unlocked position by the spring 35 that is not under tension in this position. The head 32 is oriented upwards and is disengaged from the curved section 23 and the pad 31 is clear of the spindle 2. In the event of a rear end collision, the inertia of the head 32 that is provided with enough mass to ensure this, will cause the locking member to pivot against the resistance of the spring 35. Once the unstable balance point is passed, the locking member will continue to pivot assisted in its motion by the spring 35 until the head 32 is pressed against the curved section 23.

In the locked position, the spring 35 will apply enough effort against the locking member 30 to ensure a minimum level of contact between the grooved surface 321 of the head 32 and the grooved surface 232 of the curved section 23.

To return the locking part 30 to its unlocked position after such a collision, pull back means are provided so that the locking part is automatically returned to the unlocked position when the headrest is pivoted forward until its end of travel position as defined by the clamp 126. These pull back means comprise for example, as shown in the diagram, a tab 225 formed from the outer side plate 22 and folded towards the inner side plate 12 so that its end is located in the space between the planes of these two side plates. This tab 225 is shaped so that it cooperates, when the headrest is brought into its extreme position of rotating, in the direction that is the opposite to its first rotation direction (corresponding to pivoting the headrest towards the rear), with an element of the locking member, in order to return it to the unlocked position. This element of the locking member can for example comprise, as shown in the drawings, a flattened end 36 on the shaft 33 of the locking member, this flattened end 36 will stand out in the space between the two inner 12 and outer 22 side plates, without interfering with the latter, so that it does not interfere with the pivoting of the articulation assembly.

As shown in FIG. 5, when the headrest is pivoted forward, the tab 225 comes to press against one side of the flattened end 36, correctly oriented in relation to the locking part. This creates enough torque to turn the flattened end 36 around the axis 8, and therefore also to pivot the locking member in order to return it to its unlocked position, overcoming the effort exercised against it by the spring 35.

Figure 10:
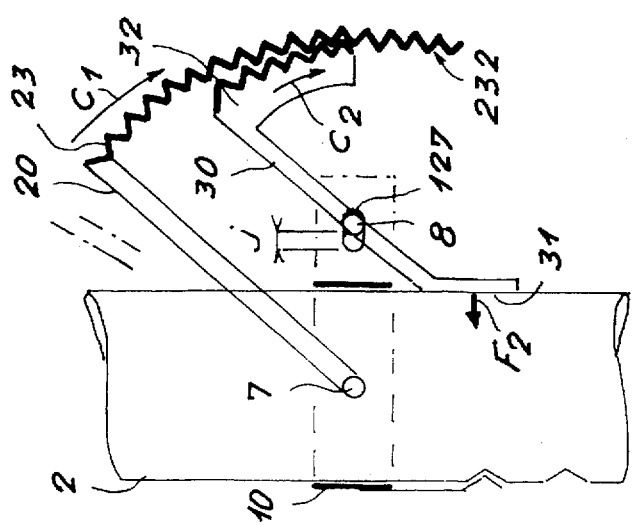
Figure 9:
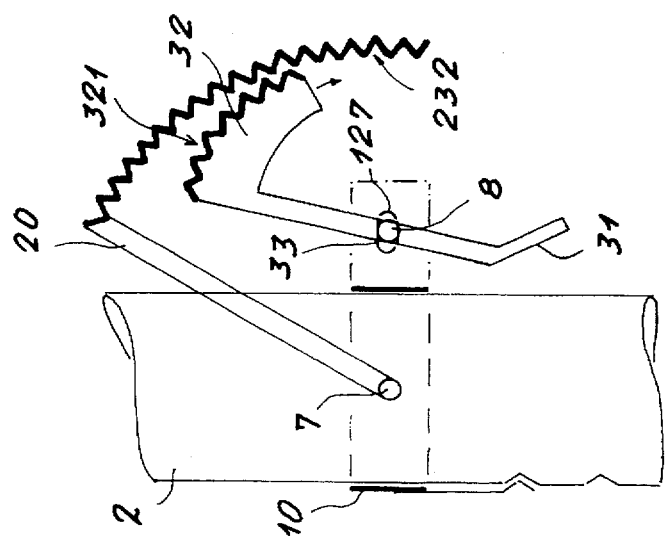
Figure 8:
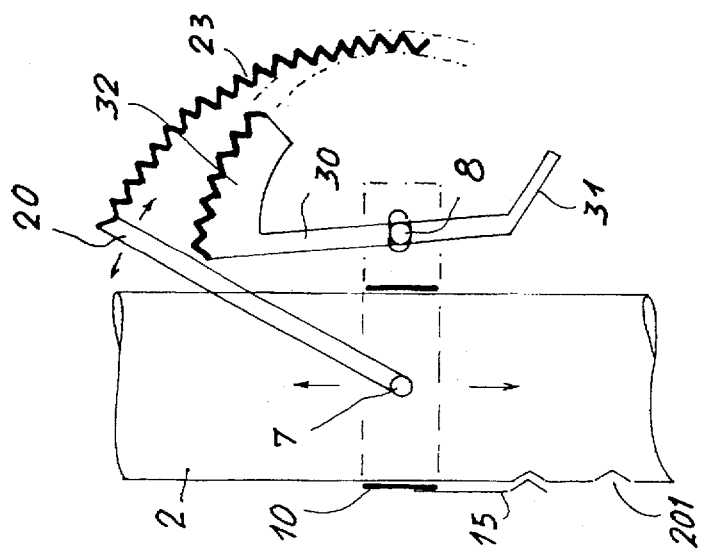

To better understand the operation of the mechanism at the time of a collision, FIGS. 8 to 10 illustrate the successive phases of locking part 10 movement.

In FIG. 8, the mechanism 6 is shown in the headrest's normal operating position, i.e. with the locking part 30 in the unlocked position. In this position, the entire translation guiding assembly 10 can be adjusted by the user by sliding it along the spindle 2. The retention of the adjusted headrest position is ensured by the cooperation of an elastic part such as spring 15 described previously, in contact with one of the notch 201 on the spindle 2. In addition, the articulation assembly 20 can pivot around the articulation axis 7.

When a collision occurs, the locking member 30 pivots under the effect of the inertia forces, as described previously, and as shown in FIG. 9. Given the difference in location between the axis 8 of the locking member 30 and the headrest articulation axis 7, which is also the axis of the arc of a circle formed by the surface 232 of the curved section 23, the head 32 of the locking part comes into contact with the surface 232 and the grooves on its surface 321 will to some extent engage the grooves on the matching surface 232, while simultaneously the pad 31 will come closer to the spindle 2. It will be noted that the axis of the surface 232 on the curved section 23 and the articulation axis 7 must pretty much coincide, so that the mechanism can operate regardless of the fore and aft adjustment position set by the user, and therefore of the angular position of the articulation assembly 20, and so that the contact between the pad and the curved section will always be initiated with approximately the same angular position of the locking member 30 and so that simultaneous contact is assured between the pad 31 and the spindle 2. However a slight shift in the axes or imperfect circularity of surface 232 can be compensated by the ability of the pad 32 to deform, as previously mentioned, or by a slight freedom of axis 8, as we will describe later.

The articulation axis 7 is not necessarily located on the same plane as the axis of the spindle 2.

The drawing in FIG. 10 represents the mechanism in its final locking position when, after a collision, the user's head comes to rest sharply against the headrest. This effort creates, as previously shown in FIG. 3, a torque C1 on the articulation assembly, which tends to make it pivot in the direction of the arrow shown in FIG. 10.

If the head surface 321 was a cylindrical surface having as its axis the axis 8 of the shafts 33 of the locking member 30, this slight rotation of the articulation assembly 20, that results from taking up the inevitable clearance that will exist, would cause a corresponding rotation of the locking part until the pad 31 comes up against the spindle 2.

It is however preferable, to improve the engagement of the head 32 against the curved section 23 and especially to ensure a larger contact area between these two parts in the locked position, that the surface 321 be as closely complementary as possible with the surface 232 of the curved section, and therefore be a cylindrical surface that will equally have as its axis the axis 7. The result is therefore that the head 32 acts like a cam when it comes into contact with the curved section, and when, after being placed in contact, the articulation assembly pivots slightly towards the rear, causing the locking member to rotate. The result is a scaffolding clamping of the locking head 32 between the curved section and the shafts of the locking member. At the limit, rotation of the locking member could be blocked and then, while the headrest would in fact be locked and inhibited from rotating, its locking in translation might not be complete due to inadequate pressure of the pad against the spindle, although this can be compensated by the ability of the pad covering 311 to deform. There would in any event be a considerable amount of radial effort of the shafts 33 in their bearings 117, 127.

To avoid this stress on the bearings, and also to ensure the best possible conversion of torque C2 exercised on the head 32 into a pushing force F2 that will push the pad against the spindle, it is preferable to leave a little radial play j between the shafts and their bearings, so that a little free movement of axis 8 is allowed in a direction that is perpendicular to the spindle 2. Once again it is also preferable to ensure that this play j is obtained by making the bearing drilling 117, 127 an oblong shape as seen in FIGS. 8 to 10. The length of this drilling should however be limited to ensure that there is no adverse effect on the operation of the two-position system comprising the locking part 30 and the spring 35.

The invention is not limited to the mechanism described above only as an application example. Especially, the translation direction locking could also be performed, instead of friction of the pad on the spindle, by the engagement of notches and teeth or similar, provided on the pad with corresponding notches or teeth provided along the spindle. In the same way, the engagement of the head against the curved section to ensure the transmission of the torque applied to the headrest could be ensured by a true gearing system. Finally the respective positions of the various elements that form the mechanism, as well as the technology used to implement the headrest position maintenance function for the height and angle adjustment as well as the simultaneous translation and pivoting position locking, can be modified without leaving the context of this invention.

We claim:

1. Headrest (1) for an automotive vehicle seat comprising means for adjusting the height of the headrest and means for adjusting the headrest in the fore and aft direction by rotating the headrest around a horizontal axis (7), characterized in that it comprises at least one guidance assembly (10) for translationally guiding the headrest along a spindle (2) attached to the seat back and an articulation assembly (20) mounted pivotally on the said guidance assembly, around an articulation axis (7) that is orthogonal to the axial direction of the spindle (2), and in that it comprises a locking member (30) pivotally mounted on the guidance assembly around an axis (8) that is parallel to the said articulation axis (7), between a locked and an unlocked position, the locking member comprising a tightening pad (31) that conforms to the shape of, and presses against, the spindle (2) in the locked position, and a head (32) that is shaped to lock onto, in the locked position, a curved section (23) that is part of the articulation assembly so that, in said locked position, a rotation force on the headrest in a first direction corresponding to moving the headrest towards the back of the seat will create by engagement of the curved section (23) with the head (32) of the locking member (30), a rotation torque (C2) that will rotate the said locking member so that the pad (31) is pressed against the spindle (2).

2. A headrest according to claim 1, characterized in that the curved section (23) has a revolution surface (232) that has the headrest's articulation axis (7) as its rotation axis.

3. A headrest according to claim 2, characterized in that the head (32) of the locking member (30) has a grooved surface (321) and the revolution surface (232) of the curved section (23) also includes grooves that are parallel with the grooves of the locking member and parallel with the articulation axis.

4. A headrest according to claim 1, characterized in that it uses a two position bistable spring (35) mounted between the locking member (30) and the guidance assembly (10) to maintain in place the said locking member alternatively in the locked or unlocked position.

5. A headrest according to claim 1, characterized in that the pad (31) is in part made of or covered by an elastically deformable material (311).

6. A headrest according to claim 1, characterized in that it includes means (225, 36) for automatically pulling back the locking member (30) from its locked position to the unlocked position when the headrest is pivoted in an opposite direction to the said first rotation direction.

7. A headrest according to claim 6 further wherein:
the said curved section (23) is maintained between two side plates (21, 22) that form the articulation assembly (20), jointly liable with the headrest and mounted so that they pivot on the guidance assembly (10), the locking member (30) being mounted so that it pivots on the guidance assembly (10) between the headrest rotation axis (7) and the curved section (23); and further wherein the said pull back means includes a tab (225) jointly liable with one of the two side plates (21, 22) and shaped so that it cooperates, when the headrest is brought to an extreme pivoting position in the opposite direction to the said first rotation direction, with an element (36) of the locking member (30), to return the locking member to its unlocked position.

8. A headrest according to claim 1, characterized in that the said curved section (23) is maintained between two side plates (21, 22) that form the articulation assembly (20), jointly liable with the headrest and mounted so that they pivot on the guidance assembly (10), the locking member (30) being mounted so that it pivots on the guidance assembly (10) between the headrest rotation axis (7) and the curved section (23).

9. A headrest according to claim 1, characterized in that the translation guidance assembly (10) is formed of two parts (11, 12) with a general U shape with lips (111, 112, 121, 122) of which are drilled holes (118, 119, 128, 129), the two said parts being assembled by guidance sockets (13, 14) for the spindle (2), inserted into two axially aligned holes.

10. A headrest according to claim 1, characterized in that the headrest articulation on the guidance assembly (10) includes at least one rivet (71) that forms an axis, a friction washer (72) placed between the guidance assembly (10) and the articulation assembly (20) and elastic means (73) that will press these assemblies against the friction washer.

* * * * *